(12) United States Patent
Sarangam et al.

(10) Patent No.: US 7,779,178 B2
(45) Date of Patent: Aug. 17, 2010

(54) METHOD AND APPARATUS FOR APPLICATION/OS TRIGGERED LOW-LATENCY NETWORK COMMUNICATIONS

(75) Inventors: Parathasarathy Sarangam, Portland, OR (US); Anil Vasudevan, Portland, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 11/172,513

(22) Filed: Jun. 29, 2005

(65) Prior Publication Data

US 2007/0005827 A1 Jan. 4, 2007

(51) Int. Cl.
*G06F 13/22* (2006.01)

(52) U.S. Cl. .......................... 710/46; 710/220; 710/260

(58) Field of Classification Search .................... 710/46, 710/5, 22, 220, 260, 262, 48, 52, 54; 709/250, 709/235, 200, 224, 246, 216; 370/235, 402, 370/449, 230; 719/321; 718/1
See application file for complete search history.

(56) References Cited

U.S. PATENT DOCUMENTS

| | | | | |
|---|---|---|---|---|
| 5,276,896 A * | 1/1994 | Rimmer et al. | ............. | 709/216 |
| 5,696,912 A * | 12/1997 | Bicevskis et al. | ........... | 710/305 |
| 5,764,896 A * | 6/1998 | Johnson | ...................... | 709/250 |
| 6,098,142 A * | 8/2000 | Leggett et al. | .............. | 710/220 |
| 6,185,639 B1 * | 2/2001 | Kailash et al. | ................ | 710/48 |
| 6,256,660 B1 * | 7/2001 | Govindaraju et al. | ........ | 709/200 |
| 6,434,651 B1 * | 8/2002 | Gentry, Jr. | ................... | 710/260 |
| 6,658,469 B1 * | 12/2003 | Massa et al. | ................. | 709/224 |
| 6,754,738 B2 * | 6/2004 | Brice et al. | .................... | 710/48 |
| 6,976,100 B2 * | 12/2005 | Dirstine et al. | ................ | 710/54 |
| 7,065,598 B2 * | 6/2006 | Connor et al. | .............. | 710/260 |
| 7,327,674 B2 * | 2/2008 | Eberle et al. | ................. | 370/230 |
| 7,330,427 B2 * | 2/2008 | Rodriguez et al. | .......... | 370/230 |
| 7,562,105 B2 * | 7/2009 | Liu et al. | ..................... | 708/270 |
| 2005/0097226 A1 * | 5/2005 | Tripathi | ...................... | 709/250 |
| 2005/0228917 A1 * | 10/2005 | Brink et al. | ................. | 710/200 |
| 2006/0045109 A1 * | 3/2006 | Blackmore et al. | .......... | 370/402 |

* cited by examiner

*Primary Examiner*—Henry W. H. Tsai
*Assistant Examiner*—Cheng-Yuan Tseng
(74) *Attorney, Agent, or Firm*—Blakely, Sokoloff, Taylor & Zafman LLP (57) ABSTRACT

A data buffer that is a target for data received over a communication channel is examined, and a device associated with the communication channel is polled, to find, process, and return data transmitted over the channel. Other methods and apparatus to reduce network latency are described and claimed.

10 Claims, 7 Drawing Sheets

METHOD AND APPARATUS FOR APPLICATION/OS TRIGGERED LOW-LATENCY NETWORK COMMUNICATIONS

FIELD OF THE INVENTION

Embodiments of the invention relate to improving the performance of networked systems. More specifically, embodiments of the invention are directed at reducing latency in network data communications.

BACKGROUND

The Internet Protocol ("IP") is a network data transfer protocol that serves as the foundation of almost all Internet communications. Other protocols (for example, Apple Computer, Incorporated's Appletalk™ and Novell Incorporated's NetWare™) serve some of the same needs. Network protocols are used to transfer data from system to system over a variety of wired and wireless physical media such as Ethernet™, Token Ring, Wi-Fi®, and InfiniBand®. Systems that are to exchange data must have hardware such as a network interface card ("NIC") to interface to the physical media, driver software to control the NIC, software or hardware to implement the network protocol, and software to produce or receive the data to be transferred.

Many network protocols were designed to provide high throughput, or the ability to transfer large amounts of information quickly. However, in numerous networked applications, performance depends not on throughput but latency, or the time between transmission and receipt of data. For example, a server might perform calculations for a client, where the input and output of the calculations are small amounts of data. If the server notifies the client when a computation is finished and the client sends a new unit of work, then delays between the server notifying the client and the client responding with new work represent wasted time during which the server could be performing useful services. It turns out that, in situations where cooperating processes that communicate over a network send queries and replies in a "ping-pong" fashion, delays in delivering data from the network to the application can consume a significant fraction of the applications' run times, and that reductions in latency can provide large performance benefits.

Some approaches to reducing network latency involve changing (or replacing) network protocols or performing protocol processing in hardware, both of which have serious drawbacks. For example, iWARP (Internet Wide Area RDMA Protocol, where RDMA stands for Remote Direct Memory Access) achieves some latency reduction but requires applications to be modified to use the protocol, while RNICs (RDMA-capable Network Interfaces) are complex and expensive hardware devices. Simpler, lower-cost alternatives to reduce network latency without requiring software redesign, that can make better use of inexpensive network interfaces such as stateless Ethernet controllers may be of significant value.

Cooperating applications that use network protocols to communicate often use a generic interface provided by an operating system to perform the lower-level tasks involved in transmitting and receiving data over a network. For example, an application may use a "read" subroutine to obtain data from another system on a network, or a "write" subroutine to transmit data to another system. The subroutines may be provided as shared object files, shared or static libraries, or similar formats such as dynamic link libraries ("DLLs"). These formats often permit the software implementing the lower-level network tasks to be corrected or upgraded without affecting the applications themselves. For example, a shared library providing an improved "read" subroutine could be installed on a system, and any applications that used the library would benefit from the improved subroutine.

Many computer systems are controlled by an operating system ("OS") that can create the illusion that the system is performing several tasks simultaneously. In fact, only one task is executing at a time (in a system with multiple central processing units ("CPUs"), one task may be executing on each CPU) and the operating system switches between tasks many times per second, allowing each task to execute for a period of time called a "time slice." Switching from one task to another (a "context switch") is a relatively expensive event because the operating system must save the current state of one task and load the previously-saved state of the next task, and the execution of the new task may proceed slowly if, for example, the CPU needs to load its cache memories with instructions or data used by the new task. Nevertheless, some application programs are designed to relinquish the processor intentionally ("block") when they must wait for an event to occur, thus giving up the remainder of their time slice, instead of repeatedly checking whether the event had occurred in a "busy-waiting," polling loop.

At a lower level, logically between the operating system and the underlying hardware, computer systems and their component subsystems use signals called interrupts to trigger certain processing sequences. For example, a NIC that has received a packet may issue an interrupt to ensure that the packet is dealt with quickly. An interrupt causes a CPU to suspend its current operations and to execute an interrupt service routine ("ISR"), which can perform any time-sensitive actions that must occur immediately, and can arrange for other actions to happen within the operating system's normal task scheduling system. Interrupts may be less expensive than a full context switch, but can nevertheless consume a significant amount of processing time, particularly if they are issued at a high rate.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

High performance systems such as those used for clusters require interconnects that provide high-bandwidth, low-latency data transfer characteristics. The total latency of a data transfer from one node to another is the sum of the latencies in the following components: source system transmit latency, wire latency (transmission latency), and destination system receive latency. The primary contributors to latency on the end systems are overheads associated with interrupt processing, hardware descriptor processing, protocol processing, data movement, and input/output ("I/O") completion overhead. Reducing end-system latency involves streamlining or eliminating these operations. Embodiments of the invention address interrupt processing and I/O completion overhead.

Embodiments of the invention reduce latency in network connections by polling a network device when an attempt to read network data is made, or when certain other operations are performed. Traditionally, a read( ) operation that cannot be satisfied with already-received data causes the program to block, or cease execution, until data is received. Blocking causes a context switch as the OS chooses some other task to execute. Later, when a network packet arrives, the network interface interrupts the CPU and (eventually) the data is placed in a receive buffer. Then the blocked program is unblocked and eventually resumes execution. Polling the device when data is requested but has not yet been received allows data to be received more efficiently, because the process does not block. Polling the device from within the program context eliminates expensive context switches, and can eliminate interrupt processing if the received data is dequeued from the device before it raises an interrupt. Embodiments of the invention can be implemented as a shared library or DLL that maintains the semantics of existing network operations, so that legacy applications can benefit from the reduced latency without redesign or even re-compiling.

Figure 1:
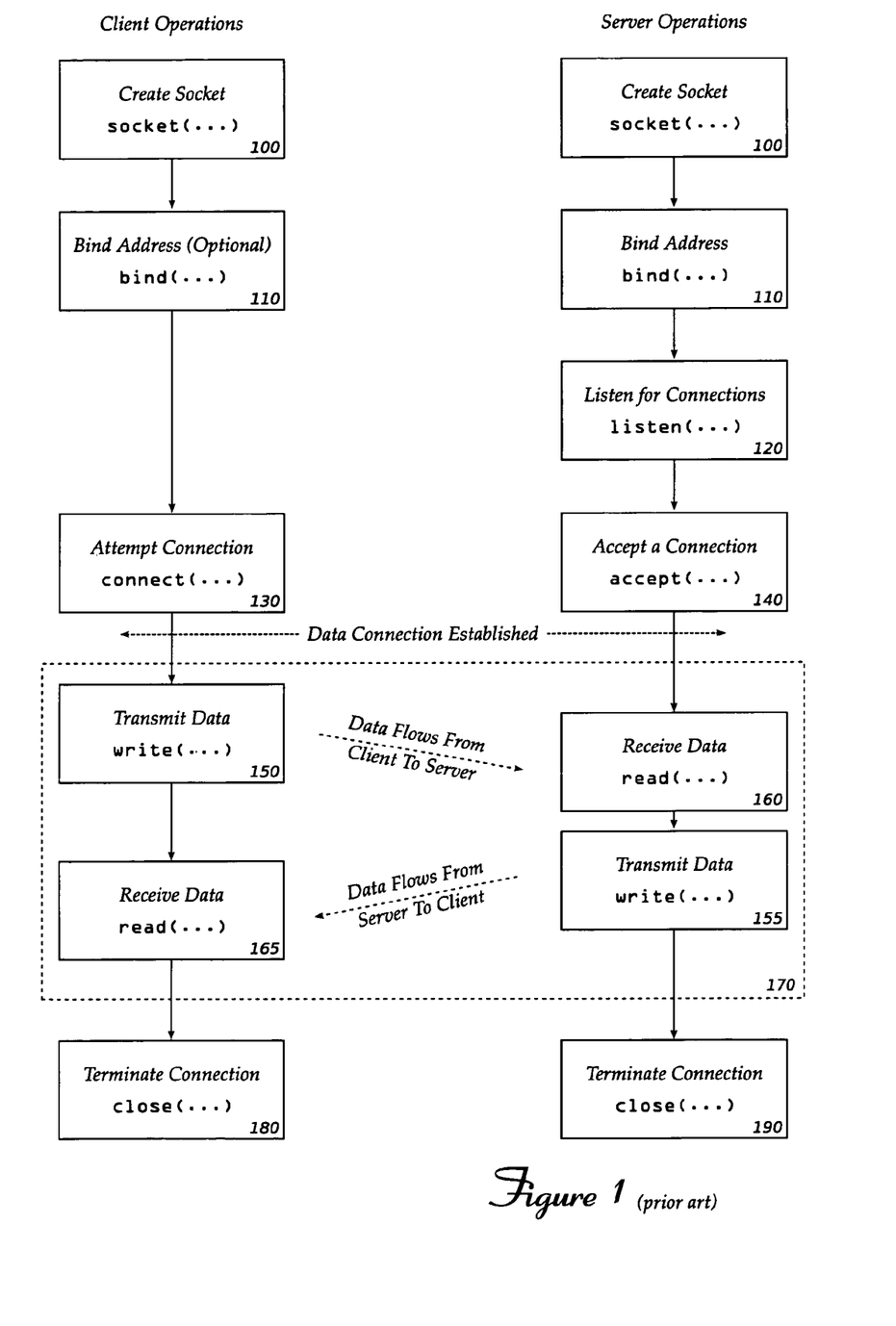
FIG. 1 is a flow chart of network operations performed by a typical client and a typical server.

FIG. 1 shows the operations of a typical client application and a typical server application in flow-chart form. Each block lists a subroutine call from the widely-used Berkeley Standard Distribution ("BSD") style of network programming. Other sets of subroutine calls may be used in other styles of network programming, but the calls have generally similar semantics and can be used to achieve equivalent ends.

In block 100, both the client and server create a socket which is used for subsequent operations. The socket( ) subroutine call selects a network protocol that the program will use and causes the operating system to allocate resources that are necessary to perform network communication. Next, the server will (and the client may) bind a network address to the socket with the bind( ) subroutine call, 110. Binding an address establishes a logical "place" at which the server can receive data from its clients.

Once the server binds an address, it informs the operating system that it wishes to receive information from clients by executing the listen( ) subroutine, 120. Next, the client may call the connect( ) subroutine to attempt to establish a data connection with the server (130), and the server may call accept( ) to accept such a connection (140). Both of these subroutine calls may block: the client may stop executing until its operating system locates the server, sends data to request a new connection, and receives a reply confirming that the connection has been established. The server may stop executing until its operating system receives a request to connect and sends an appropriate reply. Both connect( ) and accept( ) may become unblocked after the data connection is established. Thereafter, there may be no distinction between the client and server as far as the operating system and/or network protocol are concerned; either side may send data to the other side, or receive data from the other side.

In the example interaction depicted in the flow chart, the client is shown transmitting data first, by executing the write( ) subroutine at 150. The write( ) function may or may not block, depending on factors such as the guarantees offered by the subroutine as to whether written data has actually been transmitted and when the network interface is able to accept data for transmission. In contrast, the server's read( ) subroutine call (160) is likely to block until data is actually received. The data sent by the client will travel across the network connection, to the server's network interface, and may be processed at several operating system or library levels on the server's machine before being delivered to the server through the read( ) call (160).

The server may subsequently prepare data and transmit it to the client through its own write( ) subroutine call (155). Similarly, the client can receive data from the server by calling read( ) (165). The conversation between the client and server can continue for as long as necessary by repeating the read( ) and write( ) operations indicated within block 170. Finally, when the applications have no further data to exchange, they can terminate the network connection by calling close( ) (180, 190).

Figure 2:
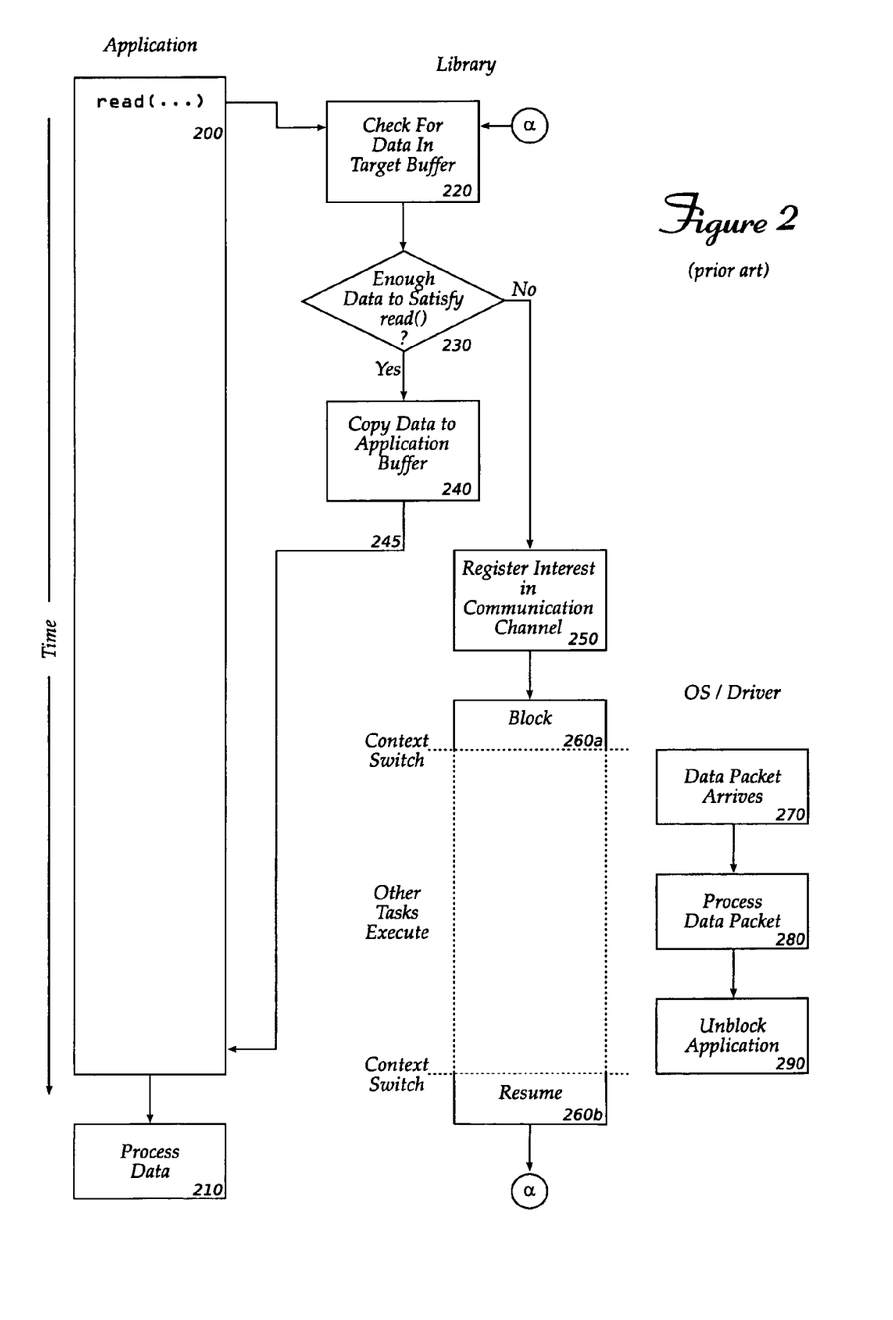
FIG. 2 is a flow chart of operations performed to complete a read( ) subroutine call.

Of particular interest in the preceding description are the read( ) operations performed by the client and server at 160 and 165. FIG. 2 shows the operations that might occur during an application's read( ) call to obtain data received over a communication channel such as a network connection. From the application's perspective, read( ) is a simple, monolithic function that results in data from the network connection being placed in a buffer that the application has prepared. However, in embodiments where read( ) can block, the end of that monolithic function might occur at a time long past the beginning.

At element 200, the application (for example, either the client or the server of FIG. 1) calls the read( ) subroutine. The extended vertical rectangle indicates that the subroutine may not return for some time. When it does return, the application can process the data that was returned by the subroutine (210).

The subroutine call will often result in a transfer of CPU execution flow to a sequence of instructions within a library (perhaps through one or more intermediate calls, not shown). In the library, the CPU may be directed to examine a data buffer that is a target for data received over the communication channel, 220. If it contains enough data to satisfy the application's read( ) request 230, the data will be copied to the application's buffer 240 and the subroutine call returns 245. If there is not enough data, the library may cause the application to block by calling another library or OS function 260a. Before relinquishing the CPU by blocking, the library may register the application's interest in data received over the communication channel 250, so that the OS will know to leave the application blocked until new data arrives.

Later—and often asynchronously—a data packet will arrive at a NIC on the system (270), and the NIC may interrupt whatever task is executing on a CPU (not shown). The interrupt service routine or a task triggered by the ISR will process the data packet (280). Processing may include calculating a checksum to verify the data's integrity, checking for duplicate data, data received out-of-order, missing portions of a data sequence, or other flaws; and/or transmitting acknowledgements as required by the network protocol in use. If the packet contents constitute valid data, the data will be placed in a buffer that is the target for data received over the network connection. At this time, the OS may also unblock the application task (290), and eventually the task scheduler will choose the application to receive processing time.

Execution within the application context will resume (260b) after the function or operation that caused the application to block, and the library will repeat its check for data in the target buffer (220). If there is enough data to satisfy the application's read( ) request (230), it will be copied to the application's buffer (240) and the read( ) function will return (245). Otherwise, the library may block again (260a), waiting for more data to arrive over the network.

Figure 3:
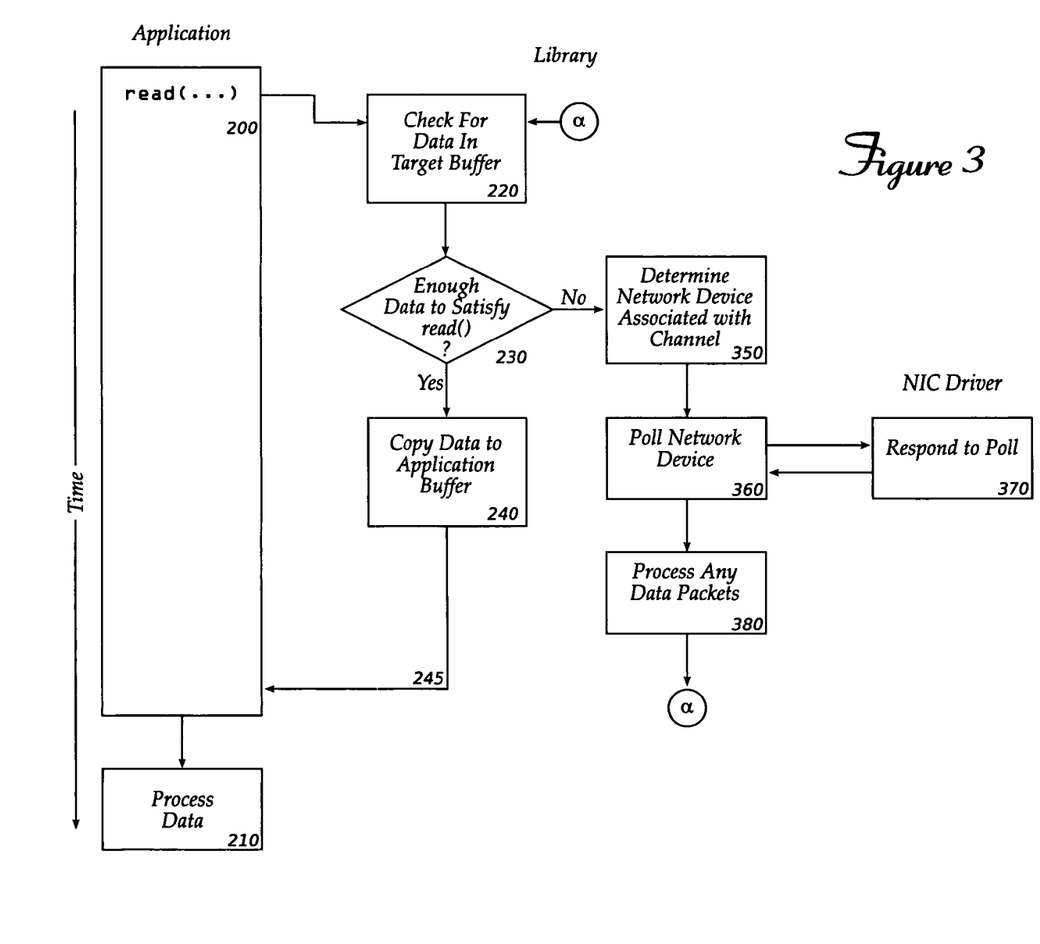
FIG. 3 is a flow chart of operations performed by an embodiment of the invention to complete a read( ) subroutine call with reduced latency.

An embodiment of the invention can improve the latency of a network data connection by altering the previously-described read( ) operation as shown in FIG. 3. As before, the application calls the read( ) subroutine (200) and execution may pass to instructions contained within a library. The library examines the data buffer that is a target for data received over the communication channel (220), and if it contains enough data (230), the application's buffer is filled (240) and the subroutine returns (245). If there is not enough data in the target data buffer, the subroutine determines which network device is associated with the communication channel (350), perhaps by examining a network address assigned to the channel and/or querying the operating system to find the relevant NIC. Then, the device itself is queried (or "polled") (360) to see whether it has received data but has not yet notified the operating system through an interrupt or similar mechanism. If the NIC's response (370) indicates that appropriate packets have been received, the library can perform any necessary protocol processing (380) itself, or it can invoke an operating system function to perform the processing. After the packets have been processed, new data may have been placed in the buffer that is the target for the communication channel, so the read( ) subroutine can repeat its check (220) and possibly return the requested data to the application (230, 240, 245). If there is still not enough data, then the polling (360) and subsequent operations (370, 380) may also be repeated. This may continue until the requested amount of data is available or until the task exhausts its time slice. If the time slice expires, the task will resume polling and checking the next time the operating system schedules it to run.

In this description of FIG. 3, it is important to observe that blocking operations are avoided. Thus, instructions from within various portions of a single execution context—the application's own context—are executed, and operations that can cause a context change are not performed. In particular, the operations of examining the target buffer and polling the network interface occur within the same context. The application runs for its full time slice, and if data arrives from the communication channel during the time slice, it can be quickly received and processed because at least two context switches and possibly one or more interrupts are avoided. Since the polling and examining operations are repeated until the device receives data for the network channel, the read( ) subroutine preserves the blocking semantics expected by the calling application (i.e., the subroutine does not return until the requested data has been obtained), without actually blocking and causing a context switch.

Figure 4:
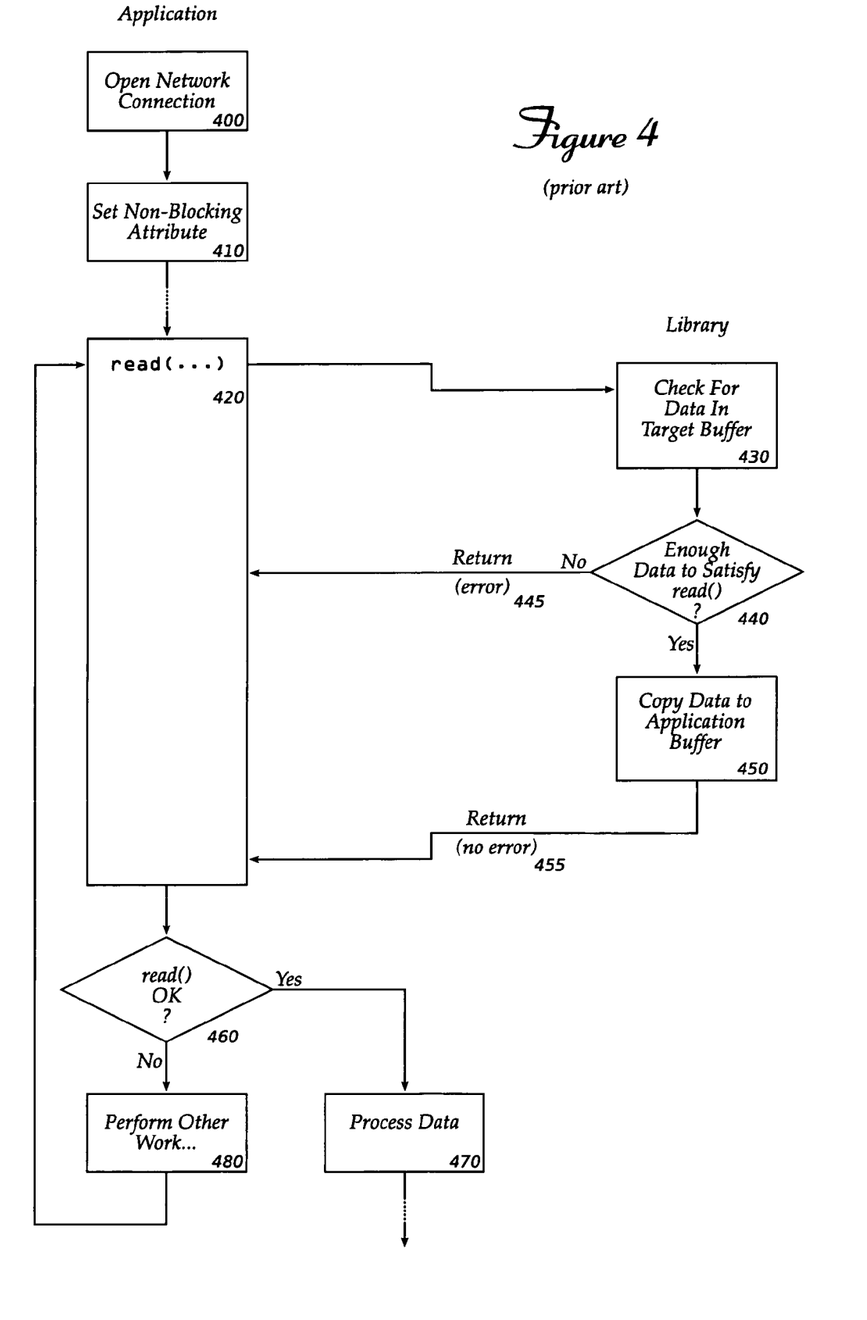
FIG. 4 is a flow chart of operations performed to complete a non-blocking read( ) subroutine call.

In FIGS. 2 and 3, the examination of the read( ) subroutine has assumed that the call blocks: that it does not return until the requested data has been copied into the program's buffer. However, it is often possible to specify that operations on a network stream should not block; instead, they either complete successfully or fail, but in either case they return immediately. Non-blocking operations may be used, for example, when an application is designed to monitor two or more network connections and respond to data received on any of them. FIG. 4 shows a flowchart of a simple program that uses non-blocking I/O to read data from a network connection.

The application opens a network connection as discussed previously (400), then sets a non-blocking attribute on the socket (410). When the application is ready to process data, it calls the read( ) subroutine (420). As in the blocking I/O case, program execution generally continues within a library, which checks for data in a target buffer (430). If there is enough data to fulfill the request (440) (or, in some systems, if there is any data), it is copied to the application's buffer (450) and the read( ) subroutine returns (455). If there is no (or insufficient) data, the subroutine returns an error indication (445). In either case, the subroutine returns without blocking.

Upon return from the read( ) subroutine, the application checks the return value (460) to see whether the read was successful. If it was, the data returned can be processed (470). If the read was unsuccessful, the application may do some other work (480), then return to re-attempt the read operation (420).

Figure 5:
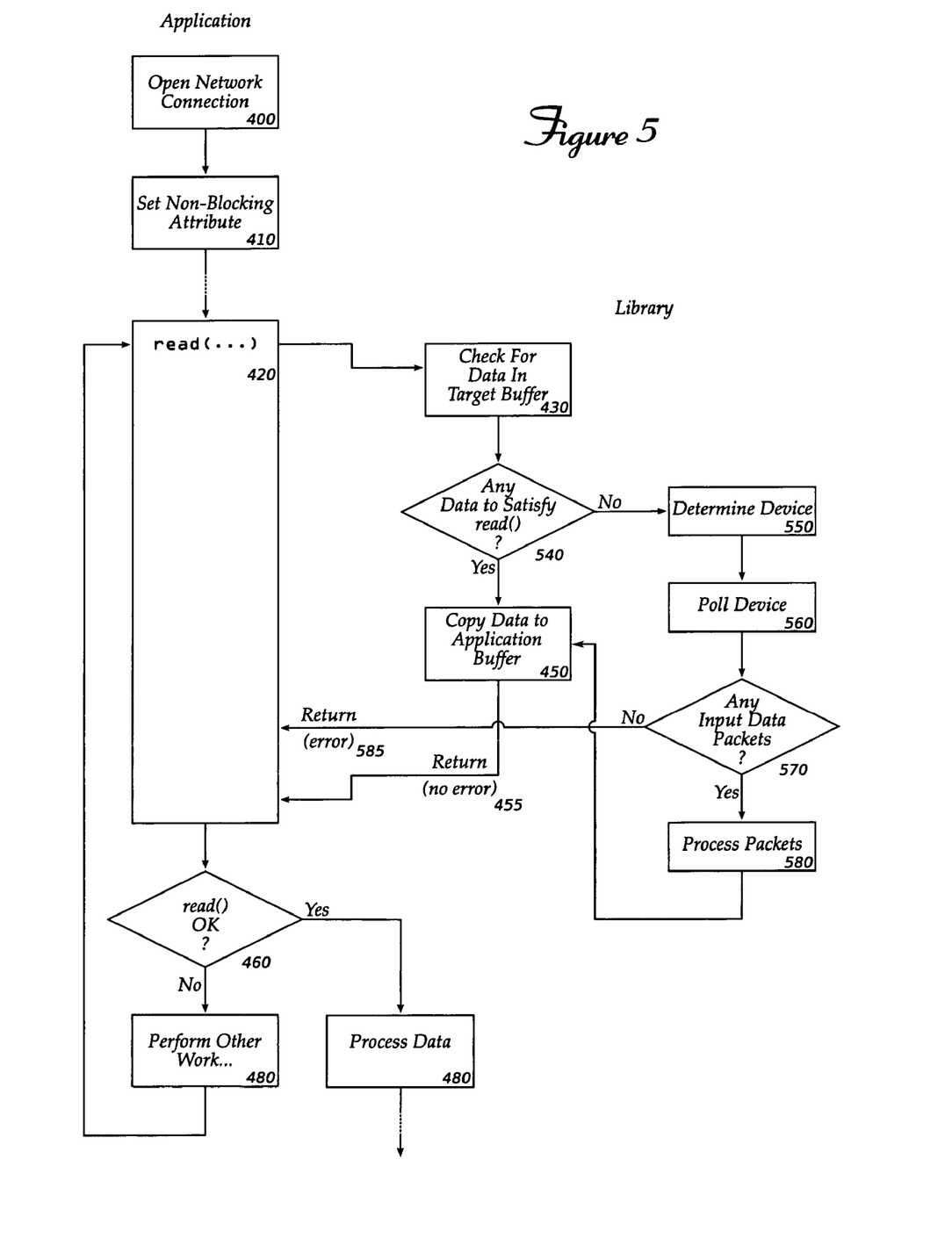
FIG. 5 is a flow chart of operations performed by an embodiment of the invention to complete a non-blocking read( ) subroutine call with reduced latency.

An embodiment of the invention can be applied in the non-blocking case as well. As FIG. 5 shows, execution proceeds in a generally similar way: the application opens a network connection (400) and sets a non-blocking attribute on the socket (410). Eventually, read( ) is called (420) to obtain a specified amount of data, and execution enters the subroutine. There, a data buffer to contain data received over the network channel is examined (430). If it contains enough data to satisfy the request (540), that data will be returned. If it contains less than the requested amount of data, the read subroutine will determine which device is the source of data for the network channel (550) and poll the device (560) to see whether it has any data packets for the channel that have not yet been processed. If such data packets exist (570), they will be processed (580) (again, within the application's own context) and a portion of the data copied to the subroutine caller's buffer (450) before the subroutine returns. (455). If there is insufficient data in the target buffer, and no unprocessed input data packets exist, the subroutine returns an error indication (585).

Although a small amount of additional processing is performed when an embodiment of the invention is used in a non-blocking connection, the processing does not alter the fundamental semantics of a non-blocking I/O call, because none of the additional processing causes the connection to block. Therefore, embodiments of the invention can be applied without requiring redesign of application software. An application can easily benefit from reduced network latency if instructions implementing an embodiment of the invention are added to, for example, a shared library or DLL that is used by the application.

In a third application pattern, the program may be designed to accept and handle work from a number of sources. For example, a server may receive data from a number of network connections, but may also monitor other interprocess communication elements such as semaphores, mutexes or events. Some operating systems provide a way to block while waiting for any of a number of different elements. For example, the various Windows™ operating systems produced by Microsoft Corporation of Redmond, Wash., offer a function called WSAWaitForMultipleEvents( ), which has the described semantics. If an application calls such a blocking subroutine, it may not be immediately apparent which network connections are among the elements being waited upon (or whether there are any such elements at all). However, an embodiment of the invention could intercept the subroutine call and examine the list of elements to find network connections that are of interest to the application, or keep track of previously-active network connections. Then, instead of allowing the subroutine call to block (and possibly to suffer two or more context switches), it could call the function in a polling (non-blocking) mode, interspersed with other non-blocking calls to poll the network devices associated with network connections of interest. By actively polling the network devices during the application's time slice, an embodiment of the invention can increase the chance that network packets received during an application's timeslice will be processed and delivered to the application quickly.

Embodiments of the invention involve "device driver" (or simply "driver") software, which controls the operation of hardware devices. Drivers are used to control the communications interfaces that permit data exchange with a physical network medium. Drivers used with an embodiment of the invention provide a "poll" function that can supply information to a caller about data packets received from the network. Although many operating systems are designed to minimize an application's necessary interactions with device drivers to improve the portability and modularity of applications, a mechanism to invoke driver functions from within an application is usually provided. In Unix-based systems, the subroutine that permits access to driver functionality is called ioctl( ), for "I/O control." Other systems may provide similar subroutines. Applications themselves, or subroutines in libraries that are called from applications, can use ioctl( ) (or an equivalent function) to invoke a network driver's poll method in some embodiments of this invention.

In some systems, the network hardware or driver software can segregate received data packets according to the logical communication channel to which they pertain. For example, packets might be identified by protocol addresses they contain, and the driver might be able to respond to a poll request with only those packets that pertain to a specified connection. When this capability is present, software inquiring about a particular connection might identify the connection to the driver by passing the connection's address, or a value such as a cryptographic hash of some portions of the connection's address. The driver could respond to the poll request with more specifically-targeted information.

Some devices or drivers may maintain two or more queues of received packets, where packets are placed on a queue depending on an identifier such as an address of the network connection. Polling software might select a queue to poll by calculating an identifier based on an address of the connection and passing the identifier to the driver software, which would examine the identified queue.

Figure 6:
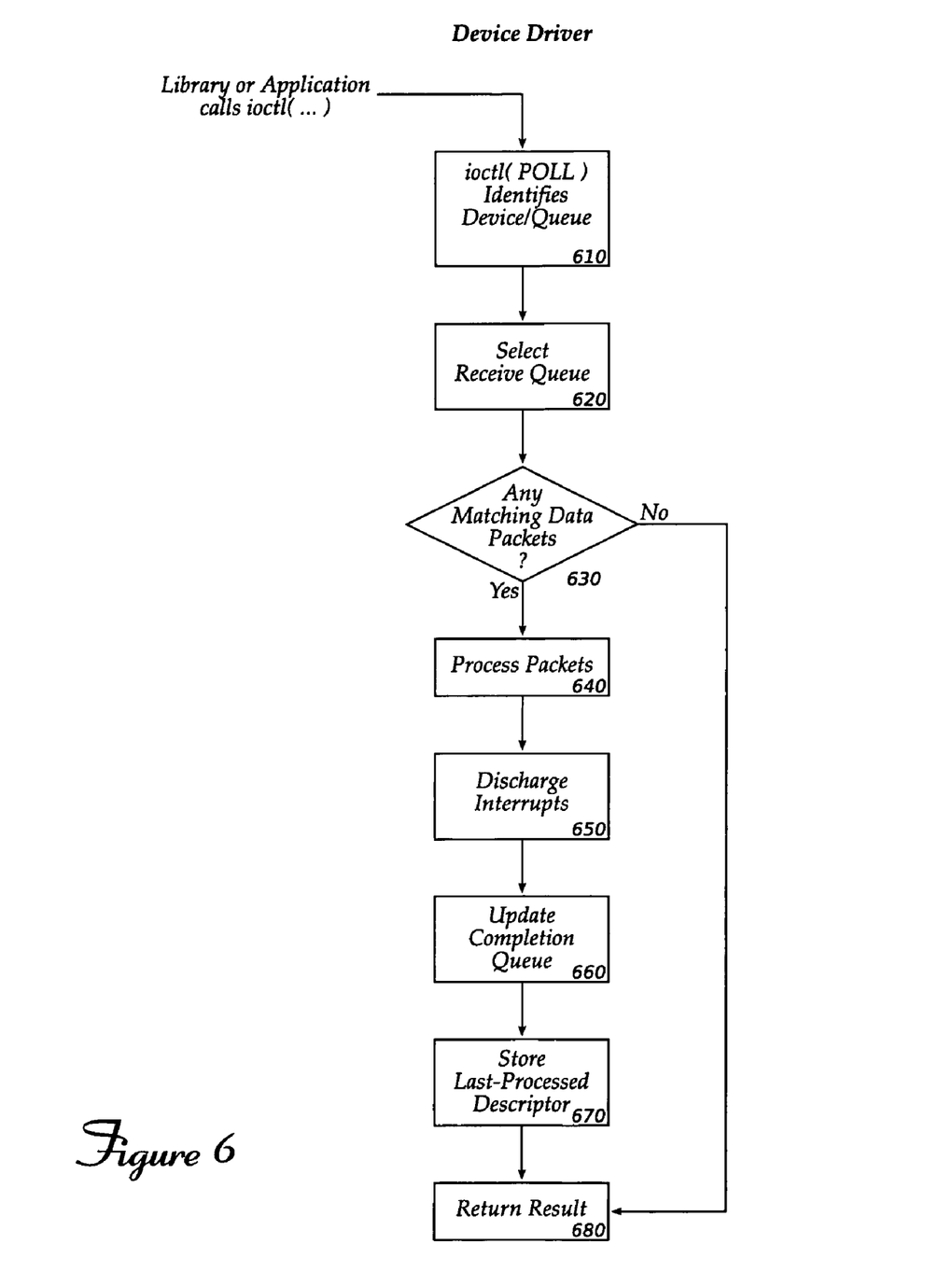
FIG. 6 is a flow chart of operations performed by a network interface device driver to implement a poll function according to an embodiment of the invention.

FIG. 6 is a flow chart showing operations that might be performed by a poll routine in a driver implementing an embodiment of the invention. At 610, the driver either receives an identifier of the communication stream of interest, or calculates the identifier based on other information provided by the caller. From the identifier, the driver selects a receive queue to inspect (620). Then, any packets present in the queue are compared to determine whether any may be relevant to the communication stream (630). If any matching packets are found, those packets (or, in some embodiments, all the packets on the queue) are processed according to the protocol's requirements (640). Processing the packets on a receive queue may discharge a pending interrupt (650): since the data has been handled, the device no longer needs to notify the CPU. If any packets were processed, a completion queue may need to be updated (660). Also, if any packets were processed, a descriptor for the last packet processed may be stored (670). Finally, a result code is returned to the caller to indicate what work was performed (680).

Embodiments of the invention can be used to improve the performance of many different sorts of network connections. Connections may, for example, use higher-level protocols such as the Transmission Control Protocol ("TCP") or User Datagram Protocol ("UDP"), which are built upon the Internet Protocol ("IP"). TCP and UDP provide different service attributes (for example, TCP provides guaranteed delivery with data integrity checks, while UDP provides only best-effort at delivery, but has lower overhead requirements). Both TCP and UDP connections can benefit from embodiments of the invention. Similarly, the performance of other network protocols such as Internetwork Packet Exchange ("IPX"), which runs over NetWare™; and the Datagram Delivery Protocol ("DDP") and AppleTalk Data Stream Protocol ("ADSP"), which run over AppleTalk™, can also be improved.

Embodiments of the invention can also be used regardless of the underlying physical network media. If a driver for the network interface provides an appropriate "poll" function that can be called by higher-level software, then connections made over that network interface can apply an embodiment of the invention. Specific examples of network media that are suitable for use include Ethernet (including 10 megabit (Mb), 100 Mb, gigabit (Gb), 10 Gb, 40 Gb, and 100 Gb versions thereof); Token Ring (4 Mb and 16 Mb versions); Infini-Band®; and others.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

Some embodiments will take the form of a shared library, shared object file, DLL, or similar data file. Such files contain instructions that can be executed by a processor, and data to permit the instructions to be accessed from one or more programs. For example, a shared library might contain instructions to implement an embodiment of the invention within a "read" subroutine; it would also contain data to locate the read subroutine within the file, and the name of the subroutine itself. When an application that used the shared library was executed, the shared library could also be loaded or mapped into memory, and any calls from the application to the "read" subroutine adjusted so that the instructions within the shared library would be executed.

Other embodiments may take the form of a static library, which is similar to a shared library or a DLL in the sense of containing instructions and data to correlate subsets of the instructions with symbols such as subroutine names. However, subroutines from static libraries are usually combined with instructions from an application during the compilation process, where the application is prepared from its source materials, instead of at execution time, as is the case with shared libraries. The use of static libraries may result in greater difficulty in replacing prior-art subroutines that lack the latency-reducing properties of embodiments of the invention, but may also avoid problems with incompatibility between different versions of a shared library or DLL.

Figure 7:
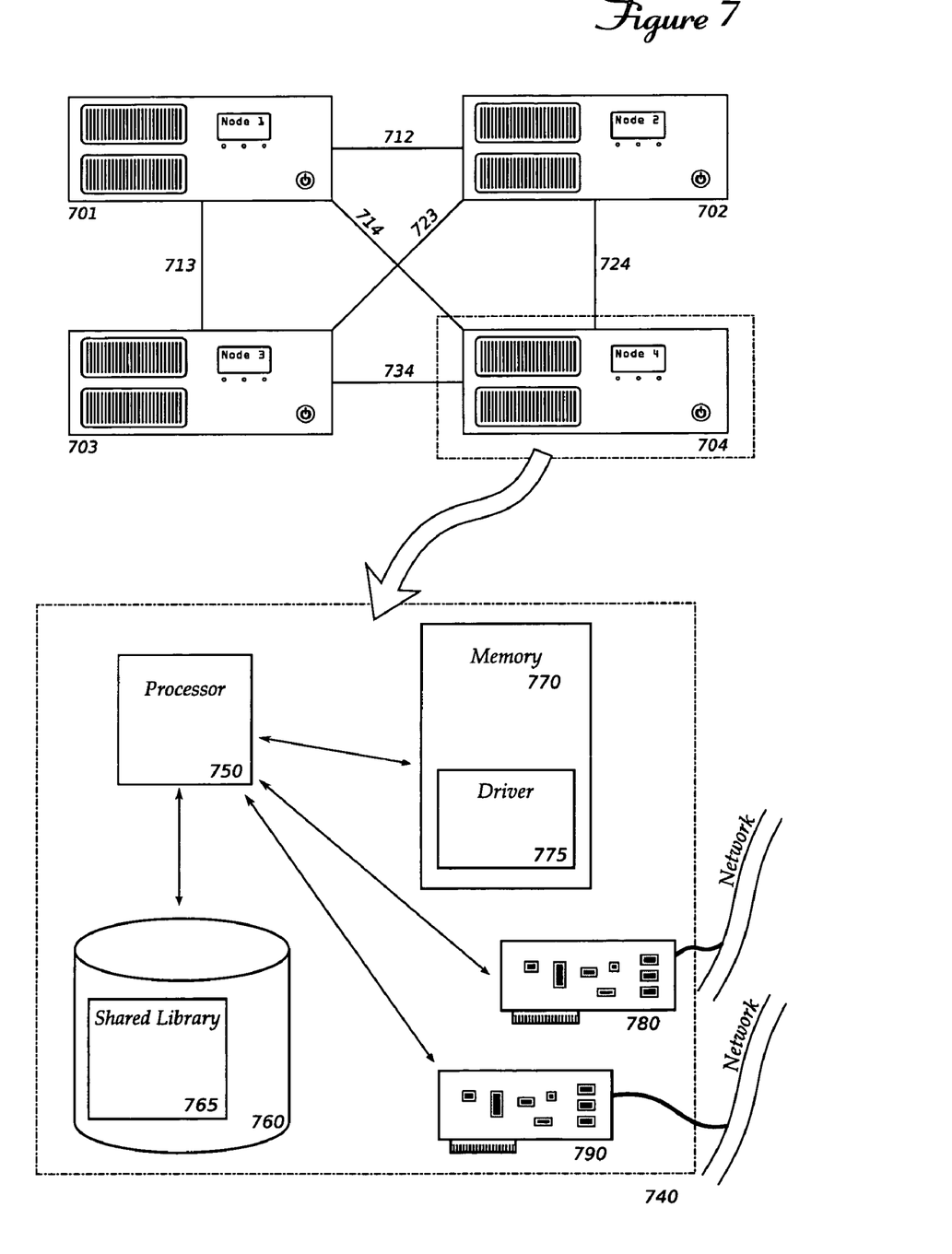
FIG. 7 is a block diagram of a computing cluster, with an inset showing typical components in a node of the cluster.

Embodiments of the invention may be useful in a computing environment similar to that shown in FIG. 7, where a number of separate machines collaborate to perform a calculation. In these "clusters," several independent machines or "nodes" 701-704 are combined into a unified system through software and network connections 712, 713, 714, 723, 724 and 734. In some clusters, each node will have many network interfaces and be connected to several or all other nodes, while in other clusters, each node may have only one network interface.

Applications running on each node perform portions of a task; then, intermediate results may be transmitted over a network connection to another machine for further processing or for assembly into a final result. Within a cluster, applications executing on different nodes often transmit and receive data in a "ping-pong" fashion, so that delays in transmission or delivery of data to an application can adversely affect the aggregate performance of the cluster.

An embodiment of the invention can be installed on some or all nodes of the cluster. Element 740 shows some components that may be included in a node: a processor 750, memory 770, mass storage 760, and network adapters 780 and 790. The mass storage device 760 may contain, for example, a shared library 765 to provide improved network communication subroutines for use by the applications, and a NIC driver 775 may be loaded into memory during system operations to provide a polling interface to the network interface receive queues. In another embodiment, the subroutines to provide improved network communication may be linked into the application from a static library when the application is compiled, so that the application itself contains the improved subroutines. These elements, constituting an embodiment of the invention, can reduce some of the latency in the network communications.

Latency reductions come from operations substantially as previously described: when an application calls a subroutine to receive data from the network, or when it calls a blocking subroutine to wait on several events including the arrival of data from the network, the driver for a network device is polled to determine whether unprocessed data of interest remains in the device's queue. If such data packets are found, they will be processed so that the data can be delivered to the application quickly. If the application makes a blocking call, polling operations may be repeated for the remainder of the application's time slice so that data arriving later in the time slice can still be processed and delivered to the application before a context switch occurs. Even if no packets arrive in the current time slice, the application may remain runnable because it is polling the device in a loop, rather than relying on the operating system's traditional interrupt-driven method of receiving and processing packets. Therefore, the application may be selected by the operating system's scheduler to receive another time slice, and may be executing and ready to receive and process data when new packets eventually arrive from the network.

A machine-readable medium may include any mechanism for storing information in a form readable by a machine (e.g., a computer), including but not limited to Compact Disc Read-Only Memory (CED-ROMs), Read-Only Memory (ROMs), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that network latency improvements can also be produced by software and hardware that distribute the functions of embodiments of this invention differently than herein described. Such variations and implementations are understood to be apprehended according to the following claims.

We claim:

1. A method comprising:
   examining a data buffer that is a target for data received over a communication channel, wherein the examining is performed in response to a request for the data from a requester application executing via a processor, wherein the examining is performed by the processor during an execution context of the processor which is for the requester application;
   based on the examining the data buffer, the processor determining if sufficient data has been received in the data buffer for the request;
   where sufficient data has not been determined to be received in the data buffer for the request:
      polling a network device associated with the communication channel, the polling including:
         the processor sending a query to the network device for available data that has arrived over the communication channel but which its arrival has not yet been announced via a pending interrupt, and
         the processor receiving the available data in response to the query,
      wherein any blocking of the execution context subsequent to the examining the data buffer is not performed until after the polling,
      processing the received available data without issuing an interrupt notifying of its arrival,
      discharging the pending interrupt for announcing arrival of the available data in response to the processing, and
      returning at least a portion of the available data to the requester; and
   where sufficient data has been determined to be received in the data buffer for the request, returning the data to the requestor.

2. A tangible computer-readable storage medium containing both data and instructions, wherein
   the data is to identify a subset of the instructions at a location within a file of the computer-readable storage medium and associate a name with the subset of the instructions; and
   the subset of the instructions is to cause a processor to perform operations including:
      in response to a request of a program for data from a communication channel, examining a received-data buffer associated with the communication channel, wherein the examining is performed during an execution context of the processor which is for the program;
      based on the examining the received-data buffer, determining that the received-data buffer does not contain sufficient data for the request;
      in response to determining that the received-data buffer does not contain sufficient data for the request, polling a network device associated with the communication channel, the polling including
         the processor sending a query to the network device for available data that has arrived over the communication channel but which its arrival has not been announced via a pending interrupt, and
         in response to the query, the network device sending the available data for processing,
      wherein any blocking of the execution context subsequent to the examining the received-data buffer is not performed until after the polling;
      copying the available data from the network device to a program buffer without issuing pending interrupt notifying of its arrival; and discharging the pending interrupt for announcing arrival of the available data without issuing the pending interrupt.

3. The method of claim 1 wherein no operation that can cause a context change is performed between the examining and polling operations.

4. The method of claim 1 wherein the communication channel is a network connection.

5. The method of claim 1 wherein the communication channel is one of a transmission control protocol (TCP) connection and a user datagram protocol (UDP) channel.

6. The method of claim 1 further comprising:
repeating the examining and polling operations until a data packet for the communication channel arrives.

7. The tangible computer-readable storage medium of claim 2 wherein the data and instructions comprise one of a shared object file, a shared library, and a dynamic link library (DLL).

8. The tangible computer-readable storage medium of claim 2 wherein the data and instructions comprise a static library.

9. The tangible computer-readable storage medium of claim 2, further comprising:
a device driver to control an operation of a communication interface, the device driver to provide a polling function to be used by the subset of the instructions associated with the name.

10. The tangible computer-readable storage medium of claim 9, wherein the communication interface is one of a 10 megabit (Mb) Ethernet device, a 100 Mb Ethernet device, a 1 gigabit (Gb) Ethernet device, a 10 Gb Ethernet device, a 40 Gb Ethernet device and a 100 GB Ethernet device.

* * * * *